United States Patent [19]
Crowe

[11] 3,962,101
[45] *June 8, 1976

[54] COMPOSITION AND METHOD FOR ACIDIZING EARTHEN FORMATIONS

[75] Inventor: Curtis W. Crowe, Tulsa, Okla.

[73] Assignee: The Dow Chemical Company, Midland, Mich.

[ * ] Notice: The portion of the term of this patent subsequent to June 8, 1993, has been disclaimed.

[22] Filed: Dec. 17, 1973

[21] Appl. No.: 425,575

Related U.S. Application Data

[63] Continuation-in-part of Ser. No. 316,421, Dec. 18, 1972.

[52] U.S. Cl. .............................. 252/8.55 C; 166/307
[51] Int. Cl.² ......................................... E21B 43/26
[58] Field of Search ............... 166/307; 252/8.55 C, 252/8.55 D, 142, 143, 312

[56] References Cited
UNITED STATES PATENTS

| | | | |
|---|---|---|---|
| 2,331,594 | 10/1943 | Blair | 252/8.55 D |
| 2,908,643 | 10/1959 | Thompson et al. | 252/8.55 D |
| 3,113,113 | 12/1963 | Marsh et al. | 252/8.55 C |
| 3,205,169 | 9/1965 | Kirkpatrick et al. | 252/8.55 C |
| 3,319,714 | 5/1967 | Knox | 166/307 |
| 3,382,179 | 5/1968 | Keeny et al. | 252/8.55 C |
| 3,404,094 | 10/1968 | Keeny | 252/8.55 C |
| 3,434,545 | 3/1969 | Bombardieri | 166/307 |

Primary Examiner—Benjamin R. Padgett
Assistant Examiner—B. Hunt
Attorney, Agent, or Firm—Bruce M. Kanuch

[57] ABSTRACT

A formation is acidized with a composition comprising a formation acidizing acid and a cationic surfactant which renders oil-containing earthen formations oil-wet, said surfactant being present in said composition in an amount which is sufficient to increase the reaction time of the acid acting on the formation.

20 Claims, No Drawings

COMPOSITION AND METHOD FOR ACIDIZING EARTHEN FORMATIONS

CROSS REFERENCE TO RELATED APPLICATION

This is a continuation-in-part application of application Ser. No. 316,421, filed Dec. 18, 1972. The teachings of said application Ser. No. 316,421 are specifically incorporated herein by reference.

BACKGROUND OF THE INVENTION

It is oftentimes desirable to increase the distance into a wellbore or earth formation into which an acidizing solution can act on the formation before it becomes spent, i.e., it is desirable to increase the reaction time of the acid.

Various methods have been utilized to increase the reaction time of various acidizing solutions on acidizable formations. For example, in some instances an emulsion is prepared containing an oil external phase and an acid internal phase. The oil separates the acid from the formation rock and thereby extends the distance into the formation that the emulsion can penetrate before the acid becomes spent. However, several disadvantages are associated with such emulsions. They are usually much more viscous than acid solutions, thus high pumping pressures are needed. Also, the stability of the emulsions are temperature sensitive; such emulsions are hard to prepare; such emulsions may block the pores of the formations and the like.

In another method an anionic surfactant which renders the surface of a formation oil-wet is dispersed into an acidizing formulation, e.g. U.S. Pat. No. 3,319,714. However, it has been discovered that these types of surfactants are not effective in aqueous solutions containing higher concentrations of acids, e.g. 20 per cent or more HCl solutions.

SUMMARY OF THE INVENTION

An aqueous acidizing acid solution is prepared containing a cationic surfactant which in the presence of said acid renders oil containing formations oil-wet. A sufficient amount of said surfactant is employed to substantially increase the reaction time of the acid acting on the formation.

DETAILED DESCRIPTION OF THE INVENTION

Surfactants which can be employed in the practice of the present invention include $C_8$ to $C_{18}$ primary fatty amines or mixtures thereof, corresponding to the formula $RNH_2$ wherein the R group comprises a $C_8$ to $C_{18}$ alkyl group. Specific surfactants which can be employed include, for example, cocoamine, dodecylamine, tetradecylamine, decylamine, octylamine, etc.

The reaction time of any aqueous acidizing acid solution for calcareous formations, e.g. limestone, dolomite and other formations, can be increased by incorporating into the acid a sufficient quantity of the above-identified surfactant. There appears to be no critical quantity and the amount employed will depend on such factors as desired increase in reaction time, economic considerations and the like. Suitable results can be obtained when as little as about 0.1 per cent by weight of the surfactant is employed. Economic considerations generally dictate a maximum amount of about 10 per cent by weight of surfactant in the acidizing formulations.

Acidizing acids which can be employed include HCl, HF, formic acid, acetic acid, sulfamic acid, various mixtures thereof and other acids which are compatible with the specific surfactants employed. The acid solutions can contain up to about 30 per cent by weight or more of the acid. The surfactants of the present invention are especially useful in solutions containing more than about 15 per cent by weight of an acidizing acid, e.g. HCl.

The surfactants which are useful in the practice of the invention, e.g. amines, are difficult to disperse into aqueous acidizing formulations. Thus, it is often desirous, especially when batch mixing procedures are employed to employ, with the surfactant, a dispersing agent (e.g. a surface active agent) such as a quaternary amine, e.g. lauryl dimethyl benzyl ammonium chloride or octyl dimethyl ammonium chloride and the like to aid in dispersing the surfactant into the aqueous solution.

If the cationic surfactant is added to a moving stream of the acid formulation, the dispersing agent may be dispensed with.

It has been found, in contrast to the teachings of U.S. Pat. No. 3,319,714, col. 4, lines 54–60, that certain cationic surfactants have as good a retarding effect in acidic formulations, and in some circumstances a better retarding effect than do certain anionic surfactants. The reason for this result is not known. However, the present invention now makes it possible to employ cationic surfactants in these acid solutions.

The method and composition of the present invention is practiced using standard acidizing equipment and procedures well known in the art. The composition and method can be employed in matrix and fracturing acidizing techniques. Further, the composition may contain other constituents, e.g. freezing point depressants, corrosion inhibitors, etc., well known in the art.

EXAMPLE 1

A series of tests were performed to determine the ability of a particular surfactant to form a tenacious oil film on a limestone surface, i.e. render the surface oil-wet. Over 400 surfactants were tested. Two per cent by volume of a specific surfactant was mixed into kerosene. A 1 inch by 1 inch by one-quarter inch limestone coupon was then soaked in the kerosene surfactant solution for 1 minute. The coupon was then removed from the kerosene surfactant solution and placed in a 15 per cent hydrochloric acid solution. The surface of the coupon was observed to determine the length of time before the coupon started to react with the HCl solution. Those kerosene surfactant solutions which produced a 5 second or longer delay in the time required for acid reaction over the entire surface were tested further as follows.

The second stage testing of various surfactants as retarders involved the determination of actual reaction rates in 15 per cent HCl under 1,000 psi pressure. Tests were performed under static conditions using a high pressure reaction rate cell maintained at room temperature. Reaction rates were run on 1 inch × 1 inch × ¼ inch Bedford limestone coupons which had previously been weighed. The acid solution to be tested was composed of 90 ml of 15 per cent HCl, 0.4 ml of a known corrosion inhibitor, 10 ml kerosene and 2 ml of a specific surfactant. The coupon and acid solution were placed in the cell and the cell pressured, with nitrogen, to 1000 psi. The test was begun by inverting the cell, thus exposing the coupon to the acid. At the end of the test period (5 minutes), the cell was again inverted, the pressure released, and the coupon removed, dried and weighed. Reaction rates were then calculated. Results using some of the surfactants tested are set forth in the following Table I.

TABLE I

| Surfactant | Reaction Rate (lb/ft²/sec) ($\times 10^{-4}$) |
|---|---|
| None | 2.54 |
| $C_{14}$ alkyl sulfonate | .16 |
| Dodecyl benzene sulfonic acid | .17 |
| Amine salt of alkyl benzene sulfonic acid | .19 |
| Cocoamine | .27 |
| Amine alkyl aryl sulfonate | .08 |
| Alkyl sulfonate | .16 |
| Anionic sulfate salt | .11 |
| Calcium sulfonate | .14 |
| Lauryl sulfate | 1.14 |
| Dimethyl cocoamine salt of orthophosphoric acid neutralized with sodium hydroxide | .28 |

Those surfactants which showed some ability to retard 15% HCl (i.e. showed a reaction rate of less than about 0.002 lbs. per sq. ft. per sec.) were next tested employing a 28% HCl solution. Test conditions were the same as employed in the second stage test described above, except that 28% HCl was used. Three surfactants, primary cocoamine, lauryl sulfate and dimethyl cocoamine salt of orthophosphoric acid neutralized with sodium hydroxide showed reaction rates of 0.18; 0.26 and 0.66 lbs/ft²/sec $\times 10^{-4}$, respectively. The next best surfactant was dodecyl benzene sulfonic acid 1.12 lbs/ft²/sec $\times 10^{-4}$ and a linear alkyl aryl sulfonic acid 1.76 lbs/ft²/sec $\times 10^{-4}$. These latter two rates are too high to be considered of practical importance.

The three surfactants listed above which demonstrated rates of 0.66 lbs/ft²/sec $\times 10^{-4}$ or less were next tested under conditions of reduced surfactant and kerosene concentration. Test conditions were the same as in previous tests except as noted in the following Table II. The reduction in surfactant and kerosene concentration greatly reduced the degree of retardation of the acid solution, i.e., the reaction rate was increased. Of the three surfactants tested, primary cocoamine showed the greatest retarding effect at the lower concentrations employed in this test. The results of these tests are set forth in the following Table II.

TABLE II

| Surfactant | Kerosene | Reaction Rate (lb/ft²/sec) ($\times 10^{-4}$) |
|---|---|---|
| None | 3% | 2.74 |
| 1% primary cocoamine | 3% | .57 |
| 1% primary cocoamine | none | 2.88 |
| 1% lauryl sulfate | 3% | 2.06 |
| 2% lauryl sulfate | none | 2.49 |
| 1% dimethyl cocoamine salt of orthophosphoric acid neutralized with sodium hydroxide | 3% | 1.29 |
| 2% dmethyl cocoamine salt of orthophosphoric acid neutralized with sodium hydroxide | none | 2.14 |

EXAMPLE 2

A series of retarding tests were performed employing cocoamine in the pressurized cell described in Example 1. In this series of tests the coupon was saturated with kerosene prior to the test. No kerosene was added to the acid solution.

The amount of primary cocoamine employed in 28% HCl was varied to determine the effect on the reaction rate of the acid. The results of these tests are set forth in the following Table III.

TABLE III

| Percent of Cocoamine In 28% HCl | Reaction Rate (lb/ft²/sec) ($\times 10^{-4}$) |
|---|---|
| 1 | .49 |
| 0.5 | .55 |
| 0.25 | .94 |
| 0.10 | 1.19 |

EXAMPLE 3

Various other amines were tested as retarders in 15 and 28% HCl by the test procedure described in Example 2. The results of these tests are set forth in the following Table IV.

TABLE IV

| Amine | Percent by wt. in HCl | HCl Conc. Percent | Reaction Rate (lb/ft²/sec) ($\times 10^{-4}$) |
|---|---|---|---|
| None | | 15 | 1.59 |
| None | | 28 | 1.62 |
| Hexyl amine | 0.5 | 15 | 1.87 |
| Hexyl amine | 0.5 | 28 | 1.86 |
| Octyl amine | 0.5 | 15 | 1.54 |
| Octyl amine | 0.5 | 28 | .88 |
| Tetradecylamine | 0.5 | 15 | 1.12 |
| Tetradecylamine | 0.5 | 28 | 1.95 |
| Hexadecylamine | 0.5 | 15 | 1.98 |
| Hexadecylamine | 0.5 | 28 | 1.76 |
| Octadecyl amine | 0.5 | 28 | 1.67 |
| Cocoamine | 0.5 | 15 | .22 |
| Cocoamine | 0.5 | 28 | .40 |
| Oleyl amine | 0.5 | 28 | 1.67 |
| Cotton seed amine | 0.5 | 28 | 1.60 |
| Tallow amine | 0.5 | 28 | 2.72 |
| Dicocoamine | 0.5 | 28 | 1.61 |
| Dimethyl cocoamine | 0.5 | 28 | 5.11 |

EXAMPLE 4

A formulation was prepared which represents the manner in which a surfactant retarder composition may be premixed and then incorporated into an acidizing acid.

The formulation contained, as per cent by volume:

45.5  cocoamine
     9.0  lauryl dimethyl benzyl ammonium
          chloride (dispersant)
    16.0  methyl alcohol
    17.0  $H_2O$
    12.5  acetic acid Reaction rate tests were performed in a dynamic pressurized cell employing 28 per cent HCl and 20 per cent HCl containing 1.1 per cent by volume of the above defined formulation. The reaction rate determined for the 28 per cent HCl solution was 10

($lb/ft^2/sec$) $\times 10^{-4}$ and with 1.1 per cent by volume of the above formulation the reaction rate was 2.0 ($lb/ft^2/sec$) $\times 10^{-4}$. The 20 per cent HCl solution had a reaction rate of 11.0 ($lb/ft^2/sec$) $\times 10^{-4}$ and the reaction rate of the 20 per cent HCl containing 1.1 per cent by volume of the above formulation was 0.6 ($lb/ft^2/sec$) $\times 10^{-4}$.

What is claimed is:

1. A composition for acidizing a subterranean formation which comprises:
    an aqueous acidizing acid solution for said formation and an effective amount of a cationic surfactant in said solution to reduce the normal reaction rate of said acidizing solution with said formation, said cationic surfactant consisting of an alkyl $C_8$ to $C_{18}$ primary amine characterized as rendering the formation surface oil-wet.

2. The composition of claim 1 including in addition a surface active agent which aids in dispersing said cationic surfactant in said acid solution.

3. The composition of claim 1 including in addition a minor quantity of oil dispersed in said composition.

4. The composition of claim 1 wherein said acid is HCl.

5. The composition of claim 1 wherein said cationic surfactant comprises cocoamine.

6. The composition of claim 1 wherein said acidizing solution contains greater than 15 per cent of said acid.

7. The composition of claim 6 wherein said acid is HCl.

8. A method of acidizing an oil containing subterranean formation with an acidizing acid solution which comprises:
    contacting the subterranean formation with an acidizing acid solution containing dispersed therein an effective amount of a cationic surfactant consisting of an alkyl $C_8$ to $C_{18}$ primary amine to increase the normal reaction time of said acidizing acid solution with said formation, said cationic surfactant characterized as in the presence of said acid, rendering oil containing formations oil-wet.

9. The method of claim 8 wherein said acidizing acid solution contains in addition a surface active agent which aids in dispersing said cationic surfactant in said acidizing solution.

10. The method of claim 8 wherein said acidizing acid is HCl.

11. The method of claim 8 wherein said acidizing acid solution contains in addition a minor quantity of oil dispersed in said solution.

12. The method of claim 8 wherein the formation contains limestone.

13. The method of claim 8 wherein said cationic surfactant comprises cocoamine.

14. The method of claim 8 wherein said acidizing solution contains greater than 15 per cent by weight of said acid.

15. The method of claim 14 wherein said acid is HCl.

16. The method of claim 8 wherein the subterranean formation comprises a calcareous material.

17. The composition of claim 1 wherein said amine is dodecyl amine.

18. The composition of claim 4 wherein said amine is dodecyl amine.

19. The method of claim 8 wherein said amine is dodecyl amine.

20. The method of claim 14 wherein said amine is dodecyl amine.

* * * * *

UNITED STATES PATENT AND TRADEMARK OFFICE
CERTIFICATE OF CORRECTION

PATENT NO. : 3,962,101
DATED : June 8, 1976
INVENTOR(S) : Curtis W. Crowe

It is certified that error appears in the above-identified patent and that said Letters Patent are hereby corrected as shown below:

Column 3, table I, under the heading, Reaction Rate, delete "(x $10^4$)" and insert --(x $10^{-4}$)--.

Column 3, table II under the heading, Reaction Rate, delete "(x $10^4$)" and insert --(x $10^{-4}$)--.

Column 3, line 64, delete "dmethyl" and insert, --dimethyl--.

Column 4, table III, under the heading Reaction Rate, delete "(X $10^4$)", and insert --(x $10^{-4}$)--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*